United States Patent [19]
Felker et al.

[11] 4,070,046
[45] Jan. 24, 1978

[54] PIPE AND TUBING CONNECTING SLEEVE

[75] Inventors: Charles E. Felker; Paul F. Rieffle, both of Pittsburgh, Pa.

[73] Assignee: Coupling Systems, Inc., Pittsburgh, Pa.

[21] Appl. No.: 737,700

[22] Filed: Nov. 1, 1976

[51] Int. Cl.² ............................................. F16L 17/00
[52] U.S. Cl. .................................. 285/337; 285/323; 285/348; 285/371; 285/421
[58] Field of Search ............... 285/337, 249, 322, 323, 285/144, 145, 146, 348, 421, 417

[56] References Cited
U.S. PATENT DOCUMENTS

| 1,574,922 | 3/1926 | Nelson | 285/323 X |
| 3,127,198 | 3/1964 | Orund | 285/146 |
| 3,594,023 | 7/1971 | Yano | 285/337 |
| 3,865,410 | 2/1975 | Chen | 285/348 X |

FOREIGN PATENT DOCUMENTS 1,944,782  6/1970  Germany ............................ 285/323

*Primary Examiner*—Wayne L. Shedd
*Attorney, Agent, or Firm*—Buell, Blenko & Ziesenheim

[57] ABSTRACT

A pipe coupling is provided having a sleeve with frusto conical ends, elastomer gaskets fitting in said frusto conical ends, a follower at each end of the sleeve having a frusto conical opening, a plurality of generally triangular jaws fitting in said opening and tightening means acting on each follower.

10 Claims, 6 Drawing Figures

PIPE AND TUBING CONNECTING SLEEVE

This invention relates to pipe and tubing connectors and particularly to a connector or coupling adapted to connect metal or plastic pipe or tubing to metal or plastic pipe or tubing to prevent leakage and separation.

There are many connectors or couplings proposed for connecting metal or plastic pipe ends together or for connecting metal to plastic pipe or tubing. One of the most critical areas for such couplings is in the gas industry where even the smallest amount of leakage can lead to serious, if not fatal, consequences. A very serious problem in this area is to provide a coupling which will permit expansion of the pipe being coupled but will prevent separation of the pipe.

The present invention provides a coupling which solves these problems of the prior art, particularly as they have applied to the gas industry, and provides a coupling which can be used to connect metal pipe to plastic pipe, metal pipe to metal pipe or plastic pipe to plastic pipe. It is, in short, universally adaptable to the materials now used to conduct fluid materials. It will permit the metal pipe ends to expand into the connector but will not permit them to be withdrawn and it will provide a leak proof connection.

There is provided in the present coupling an elongate sleeve adapted to receive coaxially two opposing pipe or tube ends to be connected, said sleeve having frusto-conical enlarged ends, a pair of frusto-conical elastomer gaskets adapted to fit in said frusto-conical ends in tight engagement around the pipe or tube ends to be connected, said gaskets extending out of said frusto-conical ends of the sleeve, a follower member at each end of the sleeve bearing on said gaskets to force them into the frusto-conical ends of said sleeve, a frusto-conical opening in each follower member around the pipe ends being connected, a plurality of spaced apart generally triangular jaws regularly spaced apart around each pipe end to be connected within the frusto-conical opening in the follower member and abutting the resilient gasket, surfacing engaging means on the face of each triangular jaw adapted to engage the surface of the pipe end to be connected and tightening means extending between the follower means acting to move them axially of the sleeve and pipe ends being joined to force the gaskets into tight sealing engagement with the pipe ends being joined and the sleeve and simultaneously force the triangular jaws into tight radial engagement with the pipe ends being connected so as to prevent their being pulled out of the connector. Preferably the triangular jaws are connected together by generally resilient means permitting them to form a generally frusto-conical ring which can be compressed to smaller diameter to engage the pipes being connected. This may be accomplished by machining a frusto-conical ring and slitting it axially to a point adjacent its base to form a plurality of side-by-side triangular jaws, with one slit passing completely through the cone to permit its reduction in diameter. The jaws may also be individually formed and connected together by intermediate rubber bonding members which permit the jaws to be bent in a circle to form a frusto-conical member. Preferably the jaw faces designed to engage the pipe are provided with teeth or knurling to engage the pipe surface. The tightening means between the followers is preferably a plurality of bolts extending between them through lugs extending radially outwardly from the followers.

In the foregoing general description certain objects, purposes and advantages of this invention have been set out. Other objects, purposes and advantages of this invention will be apparent from a consideration of the following description and the accompanying drawings in which.

Figure 1:
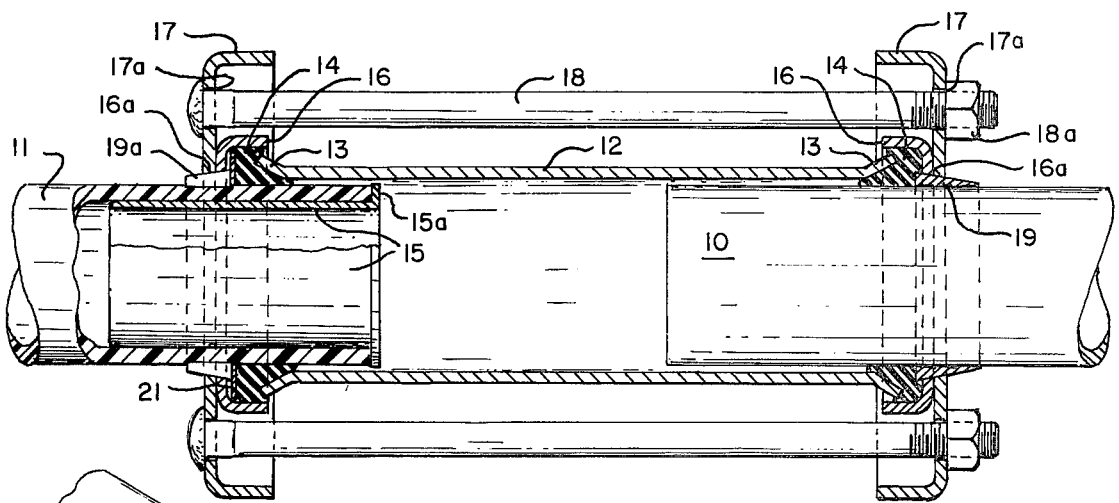
FIG. 1 is a section through a connector according to this invention showing a connection to a metal pipe at one end and a plastic pipe at the other.

Referring to the drawings there is illustrated a metal pipe 10 and a plastic pipe 11 to be connected. A sleeve 12, having a slightly larger internal diameter than the external diameter of pipes 10 and 11, is placed coaxially around the two pipes 10 and 11 to be connected. Each end of sleeve 12 has a flared or frusto-conical portion 13 receiving an elastomeric gasket 14 having a cylindrical portion and a frusto-conical end portion 14a adapted to fit in the flared end 13 of the sleeve. The elastomeric gasket 14 is adapted to fit snugly around the pipe ends 10 and 11 to be joined. In the case of plastic pipe 11 a support or stiffener sleeve 15 must be inserted into the interior end to be connected. Such sleeves are a well known article of commerce and are generally provided with a radial ring 15a at one end to abut the end of the plastic pipe. An annular cup shaped follower 16 surrounds each pipe 10 and 11, abuts the gasket 14 and is provided with radial lugs 17 having holes 17a receiving bolts 18 with tightening nuts 18a for drawing the followers axially toward the sleeve. Each of the followers 16 has a generally frusto-conical opening 16a receiving spaced triangular jaws 19 either as separate jaw members or preferably connected together in a ring. Each jaw has toothed grooves 20 adapted to engage the surface of pipes 10 and 11. The jaws 19 may bear against elastomer gasket 14 as shown at the right of FIG. 1 or against an intermediate washer 21 as shown at the left of FIG. 1. When nuts 18a are tightened on bolts 18 the gaskets 14 are forced into flared ends 13 tightly engaging and sealing the sleeve 12 to the pipe ends 10 and 11. At the same time jaws 19 are compressed by the frusto-conical opening 16a of follower 16 into tight engagement with the exterior surface of pipes 10 and 11 forcing the toothed grooves 20 into the surface of the pipe to hold it against withdrawal from sleeve 12. Thus the middle ring and pipe ends 10 and 11 are simultaneously sealed by gasket 14 and held against withdrawal by jaws 19 upon tightening of nuts 18a on bolts 18.

Figure 2:
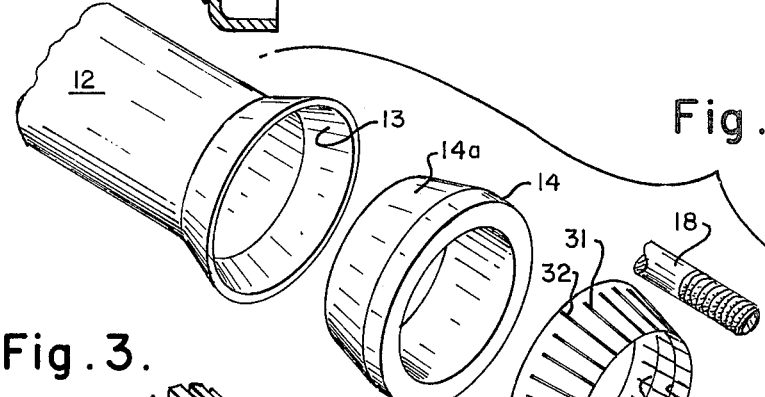
FIG. 2 is an exploded fragmentary view of the right end of the connector of FIG. 1 showing the parts involved and one form of triangular jaw holding member.

In the exploded view, FIG. 2, one form of jaw 19 assembly is illustrated. In this form a frusto-conical metal ring 30 is machined and axial slots 31 are cut from the apex and toward the base but terminates short of the base. A single slot 32 is cut completely through the ring to permit it to be compressed in diameter around pipe 10.

Figure 3:
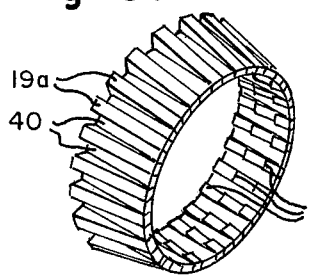
FIG. 3 illustrates a second embodiment of triangular jaw member assembly according to this invention.

In the form illustrated in FIG. 3 triangular jaws 19a with grooves 20a are connected by elastomer members 40 bonded between each of the jaw assembly 19a and thus permitting the jaws to be compressed about pipes 10 and 11.

Figures 4, 5:
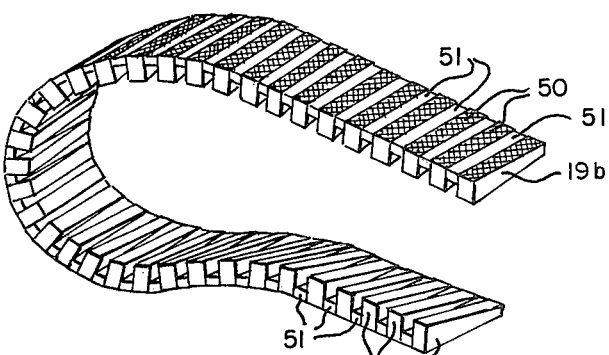
FIG. 4 illustrates a third embodiment of triangular jaw assembly in which spaced jaws are connected by elastomer connectors in a continuous band from which a piece can be cut to form a jaw member assembly for this invention.
FIG. 5 illustrates a fourth embodiment of jaw assembly.

In the form illustrated in FIG. 4, jaws 19b provided with knurling 50, are connected by elastomer members 51 bonded to the jaws to form an elongante strip from which a portion may be cut through one of the elastomer members 51 suitable for any given pipe diameter. In the embodiment it is not necessary to carry a plurality of different sizes of jaw rings for different diameters of pipe to be connected because an appropriate length can be cut in the field to suit the particular pipe being joined.

It is, of course, possible to use a plurality of separate jaws spaced about the pipes to be joined but their application is simplified by joining as described herein.

In the jaw assembly illustrated in FIG. 5 a frusto-conical metal ring 60 is machined and axial slots 61 are cut from the apex end toward the base but terminate short of the base. A second set of axial slots 62 are cut from the base between slots 61. This gives the unit more radial compressibility.

Figure 6:
FIG. 6 illustrates another embodiment of jaw assembly for use in the elastomer assembly of FIG. 4.

In FIG. 6 is illustrated a second form of jaw structure in which the base of the jaw is cut at an angle of about 45°. This reduces the likelihood of the jaw being tilted as a greater portion of the jaw extends through the conical openings 16a.

While certain preferred embodiments and practices of this invention have been illustrated and described in the foregoing specification, it will be understood that this invention may be otherwise embodied within the scope of the following claims.

We claim:

1. A coupling for joining two spaced coaxial pipes comprising an elongate sleeve adapted to receive coaxially two opposing pipe ends to be connected, said sleeve having frusto-conical enlarged ends opening outwardly, a pair of cylindrical elastomeric gaskets having frusto-conical end portions adapted to fit in the frusto-conical ends of said sleeve in sliding engagement around the pipe ends to be connected, a follower member bearing on each of said gaskets to force them into the sleeve ends, a frusto-conical opening in each follower member around the pipe ends being connected, said opening in each follower member having its large end opening toward the large end of the frusto-conical ends of the sleeve, a plurality of generally triangular jaws regularly spaced apart around each pipe end to be connected within the frusto-conical opening in the follower member, said jaws around each pipe end abutting the adjacent gasket and pressing against said gasket coaxially of said pipe, toothed surface engaging means on the face of each triangular jaw in engagement with the pipe to be connected and tightening means acting on the follower means to move the followers axially together whereby the gaskets are forced into the frusto-conical ends of the sleeve in sealing engagement with said ends and the pipe ends to be connected and simultaneously the triangular jaws are forced into tight radial engagement with the exterior of the pipe ends to be connected so as to prevent the pipe ends being moved axially out of the sleeve, said gasket and jaws coacting with each other by bearing against each other.

2. A connector as claimed in claim 1 wherein a floating annular washer having a diameter smaller than the largest diameter of the gasket is placed between the elastomer gasket and the triangular jaws within the follower means, to generally equalize the coacting forces between them.

3. A connector as claimed in claim 1 wherein the triangular jaws are connected together in the form of a ring having at least one aperture permitting the ring to be reduced in diameter.

4. A connector as claimed in claim 3 wherein the jaws are in the form of a slotted metal frusto-conical ring having a single aperture through the ring to permit reduction of its diameter.

5. A connector as claimed in claim 1 wherein the surface engaging means on the triangular jaws is a series of axially spaced teeth.

6. A connector as claimed in claim 1 wherein the surfacing engaging means is a knurled surface on the triangular jaw.

7. A connector as claimed in claim 1 wherein the triangular jaws are connected by elastomer members.

8. In a connector as claimed in claim 1 wherein said jaws comprise a jaw assembly including an elongate ribbon of spaced triangular jaws connected by elastomer members.

9. A jaw assembly for use in pipe connectors as claimed in claim 8 wherein the triangular jaws are right triangles.

10. A jaw assembly for use in pipe connectors as claimed in claim 8 wherein the triangular jaws are oblique triangles.

* * * * *

UNITED STATES PATENT OFFICE
CERTIFICATE OF CORRECTION

Patent No. 4,070,046  Dated  January 24, 1978

Inventor(s)  Charles E. Felker and Paul F. Rieffle

It is certified that error appears in the above-identified patent and that said Letters Patent are hereby corrected as shown below:

Column 2, line 59, "middle ring" should read --sleeve--.

Column 3, line 8, "elongante" should read --elongate--.

Signed and Sealed this

Sixteenth Day of May 1978

[SEAL]

Attest:

RUTH C. MASON  
Attesting Officer

LUTRELLE F. PARKER  
Acting Commissioner of Patents and Trademarks